(12) United States Patent
Kawaguchi et al.

(10) Patent No.: US 8,565,488 B2
(45) Date of Patent: Oct. 22, 2013

(54) OPERATION ANALYSIS DEVICE AND OPERATION ANALYSIS METHOD

(75) Inventors: Kyoko Kawaguchi, Tokyo (JP); Masamoto Tanabiki, Kanagawa (JP)

(73) Assignee: Panasonic Corporation, Osaka (JP)

(*) Notice: Subject to any disclaimer, the term of this patent is extended or adjusted under 35 U.S.C. 154(b) by 170 days.

(21) Appl. No.: 13/384,475

(22) PCT Filed: Nov. 5, 2010

(86) PCT No.: PCT/JP2010/006518
§ 371 (c)(1),
(2), (4) Date: Jan. 17, 2012

(87) PCT Pub. No.: WO2011/148439
PCT Pub. Date: Dec. 1, 2011

(65) Prior Publication Data
US 2012/0114183 A1  May 10, 2012

(30) Foreign Application Priority Data
May 27, 2010 (JP) .................................. 2010-121658

(51) Int. Cl.
*G06K 9/00* (2006.01)
(52) U.S. Cl.
USPC ........................................................ 382/107
(58) Field of Classification Search
USPC ........ 382/100–107; 348/154–156; 356/27–30
See application file for complete search history.

(56) References Cited

U.S. PATENT DOCUMENTS

| 2008/0123975 A1 | 5/2008 | Otsu et al. |
| 2011/0071417 A1* | 3/2011 | Liu et al. .................... 600/546 |
| 2012/0004887 A1 | 1/2012 | Kawaguchi et al. |

FOREIGN PATENT DOCUMENTS

| JP | 2003-242160 | 8/2003 |
| JP | 2006-79272 | 3/2006 |
| JP | 2008-191754 | 8/2008 |
| JP | 2008-234551 | 10/2008 |

OTHER PUBLICATIONS

International Search Report, mailed Nov. 30, 2010, for corresponding International Application No. PCT/JP2010/006518.

* cited by examiner

*Primary Examiner* — Atiba O Fitzpatrick
(74) *Attorney, Agent, or Firm* — Greenblum & Bernstein, P.L.C.

(57) ABSTRACT

A motion analysis apparatus is provided that enables a contribution degree that suits analysis conditions to be set easily. A motion analysis apparatus (300) is provided with a motion data input section (310) that receives learning data as input, a motion feature extraction section (320) that extracts a motion feature amount from learning data, a principal component analysis section (330) that performs principal component analysis using a motion feature amount on part of the learning data, and learns a subspace, a learning data distance calculation section (340) that calculates a distance between a learning data motion feature amount and a subspace, and a contribution degree determination section (350) that determines the suitability of a contribution degree used in principal component analysis, from a distance calculated from learning data that is used in subspace learning and a distance calculated from learning data that is not used in subspace learning.

8 Claims, 10 Drawing Sheets

| CONTRIBUTION DEGREE | 0.99 | 0.9999 | 0.999999 |
|---|---|---|---|
| CONTRIBUTION DEGREE EVALUATION DATA DISTANCE AVERAGE VALUE a | 13406499.80 | 239749.51 | 18507.50 |
| SUBSPACE CREATION DATA DISTANCE AVERAGE VALUE b | 11149906.11 | 117978.78 | 1130.47 |
| AVERAGE VALUE RATIO c=a/b | 1.20 | 2.03 | 16.37 |

FIG.6

| CONTRIBUTION DEGREE | 0.99 | 0.9999 | 0.999999 |
|---|---|---|---|
| CONTRIBUTION DEGREE EVALUATION DATA DISTANCE STANDARD DEVIATION e | 7644802.57 | 73908.65 | 5516.82 |
| SUBSPACE CREATION DATA DISTANCE STANDARD DEVIATION f | 7102873.41 | 34705.61 | 341.06 |
| STANDARD DEVIATION RATIO j=e/f | 1.08 | 2.13 | 16.18 |

FIG.11 a motion analysis apparatus and motion analysis method that perform analysis of motion subject to comparison by means of comparison with standard motion.

OPERATION ANALYSIS DEVICE AND OPERATION ANALYSIS METHOD

TECHNICAL FIELD

The present invention relates to a motion analysis apparatus and motion analysis method that perform analysis of motion subject to comparison by means of comparison with standard motion.

BACKGROUND ART

Conventionally, there is an apparatus that finds a subspace of standard motion by means of principal component analysis on a multidimensional motion feature amount indicating a feature of motion, and performs analysis of motion subject to comparison based on distance between a found standard motion subspace and a motion feature amount of a motion subject to comparison (see Patent Literature 1, for example).

An apparatus described in Patent Literature 1 (hereinafter referred to as "conventional apparatus") detects abnormal motion from motion subject to comparison using a cubic higher-order local autocorrelation (CHLAC) feature, this being a feature extracted from a moving image. Specifically, a conventional apparatus extracts motion feature amount feature data from an accumulated plurality of standard motions, and generates a subspace based on a principal component vector (hereinafter referred to simply as "subspace") from the extracted plurality of feature data by means of principal component analysis. Then the conventional apparatus also extracts motion feature amount feature data in a similar way from motion subject to comparison, and if the distance between extracted feature data and the subspace is larger than a predetermined value, determines that motion subject to comparison to be abnormal.

A conventional apparatus of this kind learns standard motion statistically, and can therefore perform abnormal motion detection appropriate for a monitoring target, without particularly performing standard motion definition in the design stage.

In order to prevent abnormal motion determination leakage as far as possible, a feature data cumulative contribution ratio (hereinafter referred to as "contribution degree") used when generating a subspace should be set high. A contribution degree is an index value indicating to what extent a generated subspace (principal component vector) explains original feature data. On the other hand, in order to prevent erroneous determination of standard motion, a feature data contribution degree used in principal component analysis should be set low. This is because variation of standard motion not included in original feature data can be absorbed if the contribution degree is low.

That is to say, an optimal contribution degree value depends on a monitoring target and required detection accuracy (hereinafter referred to as "analysis conditions"). Consequently, it is desirable for a contribution degree to be set to a value that suits analysis conditions.

Also, when motion analysis is performed in a factory, for example, it is assumed that camera installation locations are changed frequently in accordance with the work to be analyzed. Therefore, it is desirable for an apparatus that performs analysis of motion subject to comparison by means of principal component analysis (hereinafter referred to as "motion analysis apparatus") to allow a contribution degree that suits analysis conditions to be set as easily as possible.

CITATION LIST

Patent Literature

PTL 1
Japanese Patent Application Laid-Open No. 2006-79272

SUMMARY OF INVENTION

Technical Problem

However, with a conventional apparatus, in order to set a contribution degree that suits analysis conditions, it is necessary to accumulate analysis results for standard motion and analysis results for abnormal motion for each contribution degree, and test the suitability or otherwise of each contribution degree, by means of experimentation or the like. Also, if abnormal motion may include unsteady motion (hereinafter, abnormal motion that may include unsteady motion is referred to as "unsteady motion"), it is necessary to perform analysis and testing using an enormous amount of abnormal motion feature data. That is to say, setting a contribution degree that suits analysis conditions involves a great deal of time and effort.

It is therefore an object of the present invention to provide a motion analysis apparatus and motion analysis method that enable a contribution degree that suits analysis conditions to be set easily.

Solution to Problem

A motion analysis apparatus of the present invention extracts unsteady motion using a moving image, and has: a motion data input section that receives learning data as input; a motion feature extraction section that extracts a motion feature amount from the learning data input in the motion data input section; a principal component analysis section that performs principal component analysis on part of the learning data using a motion feature amount extracted by the motion feature extraction section, and learns a subspace; a learning data distance calculation section that calculates a distance between a motion feature amount of learning data extracted by the motion feature extraction section and a subspace learned by the principal component analysis section; and a contribution degree determination section that determines the suitability of a contribution degree used in the principal component analysis by the principal component analysis section, from a distance calculated from learning data that is used in learning of the subspace by the principal component analysis section, and a distance calculated from learning data that is not used in learning of the subspace by the principal component analysis section, among distances calculated by the learning data distance calculation section.

A motion analysis method of the present invention extracts unsteady motion using a moving image, and has: a step of receiving learning data as input; a step of extracting a motion feature amount from the learning data; a step of performing principal component analysis using a motion feature amount extracted from part of the learning data, and learning a subspace; a step of calculating a distance between a motion feature amount of the learning data and the subspace; and a step of determining the suitability of a contribution degree used in the principal component analysis, from a distance calculated from learning data that is used in learning of the subspace, and a distance calculated from learning data that is not used in learning of the subspace, among distances between a motion feature amount of the learning data and the subspace.

Advantageous Effects of Invention

The present invention enables a contribution degree that suits analysis conditions to be set easily.

DESCRIPTION OF EMBODIMENTS

Now, embodiments of the present invention will be described in detail with reference to the accompanying drawings.

Embodiment 1

Figure 1:
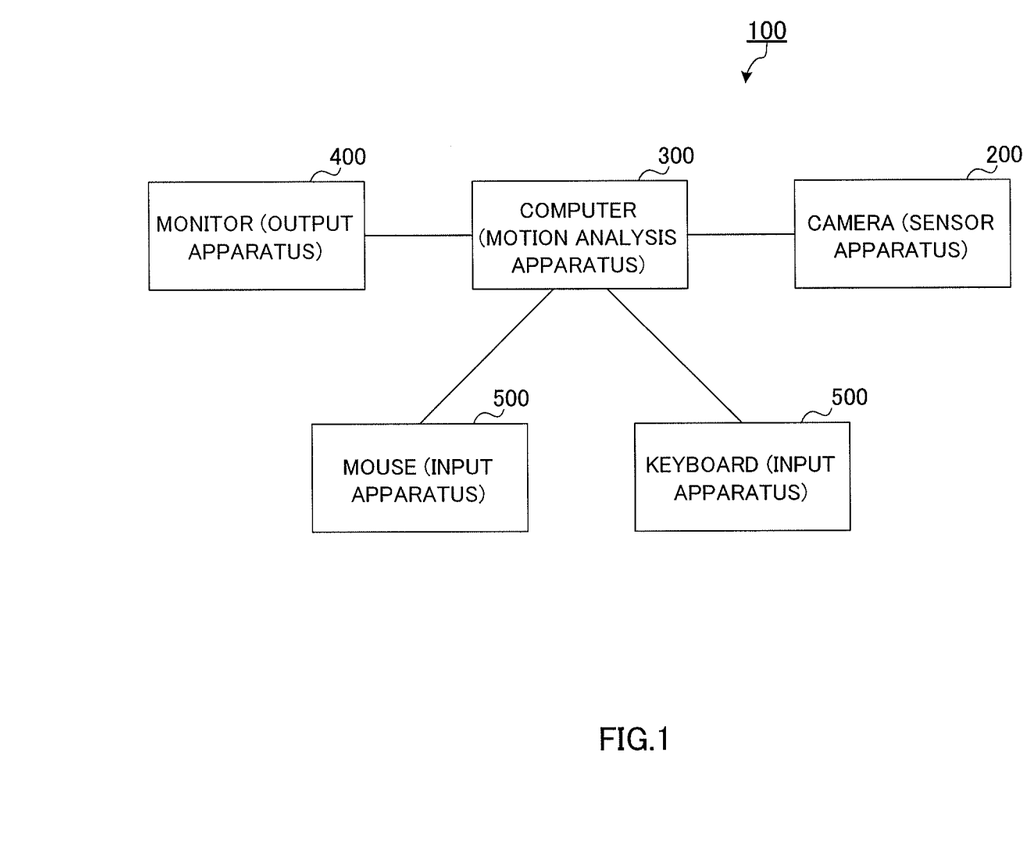
FIG. 1 is a system configuration diagram showing the configuration of a motion analysis system that includes a motion analysis apparatus according to Embodiment 1 of the present invention.

FIG. 1 is a system configuration diagram showing the configuration of a motion analysis system that includes a motion analysis apparatus according to Embodiment 1 of the present invention.

This embodiment is an example of application of the present invention to a motion analysis system for analyzing motions of each general worker in a factory in which skilled workers and general workers work. Worker motion is, for example, a series of motions comprising a plurality of the unit motions of multiple repetitions of motions of setting a product on a workbench, taking a component and fitting it onto the body of the product, and conveying the product to a neighboring worker. Specifically, a motion analysis system according to this embodiment performs motion analysis for general workers by photographing a posture of a skilled worker engaged in a certain work process, and photographing postures of general workers when engaged in the same work process from the same shooting angle. Below, an above-described general unit motion and a unit of extraction as one deviating motion by motion analysis system 100, are referred to generically as "motion."

In FIG. 1, motion analysis system 100 has sensor apparatus 200, motion analysis apparatus 300 according to this embodiment, output apparatus 400, and input apparatuses 500.

Sensor apparatus 200 is an apparatus that detects human motion, and outputs data resulting from measurement of a worker's motion to motion analysis apparatus 300. Here, sensor apparatus 200 is assumed to be a camera that outputs image frame data of a captured image (moving image data) in real time, and to be capable of individually photographing workers working on a factory assembly line.

Below, feature data obtained from video that captures a series of standard motions is referred to as "learning data," and feature data obtained from video that captures a series of motions for which there is a possibility of unsteady motion being included is referred to as "analysis target data." For convenience, learning data and analysis target data are referred to generically as "motion data."

Motion analysis apparatus 300 performs analysis of analysis target data based on a distance between a subspace learned by means of principal component analysis from learning data and motion feature amounts of analysis target data.

Also, before analysis of analysis target data, motion analysis apparatus 300 performs analysis of learning data, determines the suitability of a contribution degree used in principal component analysis, and presents a user with a determination result. Then motion analysis apparatus 300 receives a setting of a contribution degree to be used in analysis target data evaluation (hereinafter referred to as "set contribution degree"). Here, suitability of a contribution degree is an indicator of the degree to which abnormal motion and standard motion are correctly distinguished when that contribution degree is applied—that is, the degree to which a difference wished for by a user is correctly distinguished.

Specifically, motion analysis apparatus 300 performs principal component analysis using a motion feature amount extracted from part of the learning data, and learns a subspace. Below, a learning data group used in subspace learning is referred to as "subspace creation data," and a learning data group not used in subspace learning is referred to as "contribution degree evaluation data."

"Subspace creation data" is selected arbitrarily from learning data. For example, if learning data comprises a plurality of data files, motion analysis apparatus 300 takes one arbitrary file as "contribution degree evaluation data," and takes all learning data except that "contribution degree evaluation data" as "subspace creation data." Here, motion analysis apparatus 300 may use a leave-one-out method. In a leave-one-out method, when n learning data are provided, first, the n learning data are divided into (n−1) training data ("subspace creation data") and one item/set of evaluation data ("contribution degree evaluation data"). Next, in a leave-one-out method, one item/set of evaluation data is evaluated by means of learning results using the (n−1) training data. In this case, there are n ways of dividing the data, and therefore an average of the evaluation results for all those ways is calculated, and the average value is used as an evaluation value.

Then motion analysis apparatus 300 calculates a distance between a subspace and subspace creation data, and a distance between a subspace and contribution degree evaluation data. Below, a distance between a subspace and subspace creation data is referred to as a "reference distance," and a distance between a subspace and contribution degree evaluation data is referred to as an "evaluation distance." Then motion analysis apparatus 300 finds a contribution degree such that an evaluation value relating to a difference between a reference distance and evaluation distance is in an appropriate range. Next, motion analysis apparatus 300 presents the user with a found contribution degree as a set contribution degree candidate. Here, an appropriate evaluation value range is a numeric value range such that abnormal motion and standard motion are distinguished with a required degree of accuracy.

Motion analysis apparatus 300 is a computer having a CPU (central processing unit), a storage medium such as RAM (random access memory), and a video capture circuit or the like that acquires moving image data. That is to say, motion analysis apparatus 300 operates by means of execution of a stored control program by the CPU.

Output apparatus 400 is, for example, a monitor having a liquid crystal display, and outputs result display screen data input from motion analysis apparatus 300. Output apparatus 400 may also be an apparatus installed at a remote location (such as a remote monitoring apparatus, mobile phone, or the like). In this case, output apparatus 400 is connected to motion analysis apparatus 300 via a network such as the Internet, for example.

Input apparatuses 500 are interfaces used by a user to operate motion analysis apparatus 300, comprising, for example, a mouse as a pointing device and a keyboard.

Motion analysis system 100 of this kind can determine the suitability of a contribution degree based on learning data alone, and present a determination result to a user. By this means, a user can efficiently analyze the suitability of a contribution degree using principal component analysis by confirming only a presented determination result. Therefore, a user can easily set a contribution degree that suits analysis conditions.

Motion analysis apparatus 300 according to this embodiment is chiefly characterized by the capability of easily determining the suitability of a contribution degree used in motion analysis based on learning data alone. Therefore, in this embodiment, the description will focus on operations up to determination of contribution degree suitability and apparatus sections that implement these operations.

Figure 2:
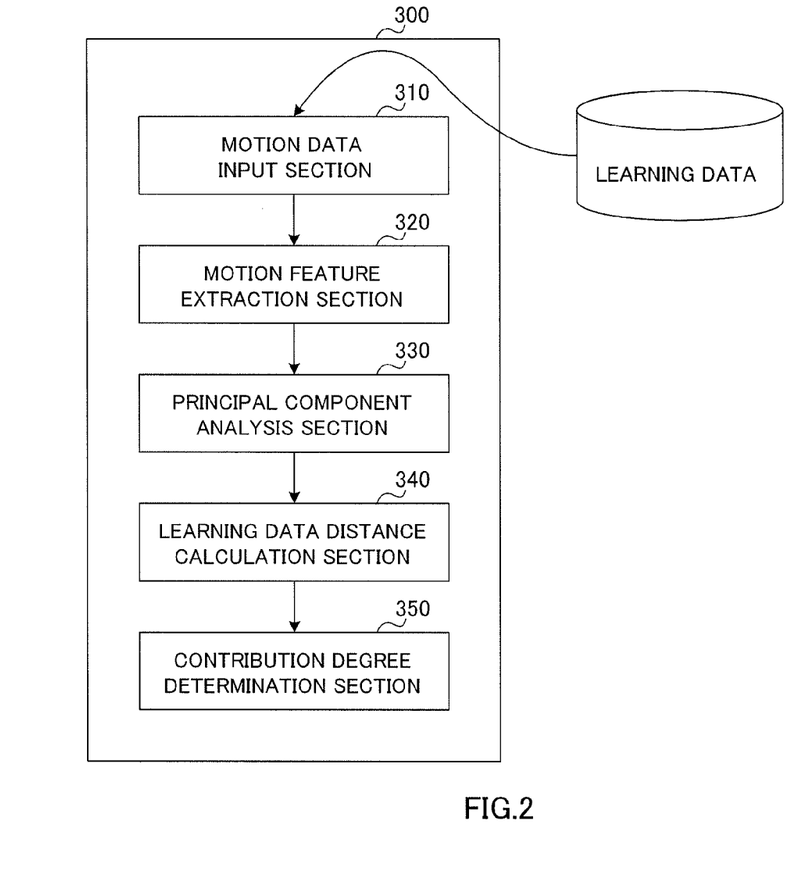
FIG. 2 is a block diagram showing the configuration of a motion analysis apparatus according to Embodiment 1.

FIG. 2 is a block diagram showing the configuration of motion analysis apparatus 300.

In FIG. 2, motion analysis apparatus 300 has motion data input section 310, motion feature extraction section 320, principal component analysis section 330, learning data distance calculation section 340, and contribution degree determination section 350.

Motion data input section 310 acquires learning data from sensor apparatus 200 in response to a request from motion feature extraction section 320, and transfers this learning data to motion feature extraction section 320. Transfer of motion data may be performed in real time, or may be performed after motion data is stored. Provision may also be made for motion data input section 310 to start operating on receiving an input apparatus 500 user operation.

Motion feature extraction section 320 extracts a motion feature amount from learning data input from motion data input section 310. Then motion feature extraction section 320 outputs the extracted motion feature amount to principal component analysis section 330.

It is assumed here that a feature amount is a CHLAC feature disclosed in Patent Literature 1. A CHLAC feature is an extension to three dimensions, through the addition of a time domain, of a higher-order local autocorrelation (HLAC) feature obtained by feature extraction from two-dimensional image data. That is to say, a CHLAC feature is a feature vector indicating a feature of movement in a three-dimensional coordinate system in which a time domain is added to the planar space of an image.

Motion feature extraction section 320 calculates CHLAC feature x using the autocorrelation function of an N-th order shown in equation 1 below, for example.

$$x_f^N(a_1, \ldots, a_N) = \int f(r)f(r+a_1)\ldots f(r+a_N)dr \quad \text{(Equation 1)}$$

Here, f is a time series image, and variable r and N variables $a_i$ (where i=1, ..., N) are three-dimensional vectors with image-internal two-dimensional coordinates and time as components. The time-direction integration range is decided according to what degree of time-direction correlation there is. That is to say, an integration range is a three-dimensional collection of pixels comprising N still images (local feature images), variable r is one pixel in an image (position pixel), and variable a is a displacement vector from r. Also, f(r) is a position r function value, expressing the brightness value of position r in a local feature image.

In the case of a CHLAC feature, displacement is three-dimensional, and the number of displacement vector combinations (displacement patterns) is one for the zero order, 13 for the first order, and 237 for the second order. Therefore, in the case of a binarized image, a CHLAC feature is expressed as a feature vector with a total of 251 dimensions.

Principal component analysis section 330 learns a subspace from subspace creation data, and outputs a principal component vector defining a learned subspace, and learning data, to learning data distance calculation section 340.

Principal component analysis section 330 calculates a principal component vector as shown below, for example. M-dimensional CHLAC feature vector x, matrix U in which principal component vectors (eigenvectors) are arrayed in columns, and covariance matrix Σ, can be expressed by equations 2, 3, and 4 below, respectively. Here, M=251, μ is a mean vector of feature vectors x, and E is an operation symbol that finds an expected value (E=(1/N)Σ).

(Equation 2)
$$x_i \in V^M (i = 1, \ldots, N) \quad [2]$$

(Equation 3)
$$U = [u_1, \ldots u_M], u_j \in V^M (j = 1, \ldots, M) \quad [3]$$

(Equation 4)
$$\Sigma_X = \sum_{i=1}^{N} \{(x_i - \mu)(x_i - \mu)^T\} \quad [4]$$

At this time, principal component analysis section 330 finds matrix U by means of the eigenvalue problem in equation 5 below.

$$\Sigma_X U = U\Lambda \quad \text{(Equation 5)}$$

Eigenvalue diagonal matrix Λ and cumulative contribution ratio (contribution degree) $\eta_K$ up to the K'th eigenvalue are expressed by equation 6 and equation 7 below, respectively.

(Equation 6)
$$\Lambda = \text{diag}(\lambda_1, \ldots, \lambda_M) \quad [6]$$

(Equation 7)
$$\eta_K = \frac{\sum_{i=1}^{K} \lambda_i}{\sum_{i=1}^{M} \lambda_i} \quad [7]$$

Principal component analysis section 330 applies space extended by eigenvector $u_1, \ldots, u_K$ up to a dimension at which cumulative contribution ratio $\eta_K$ becomes a predetermined value (for example, $\eta_K=0.99$) as a subspace.

Here, principal component analysis section 330 finds a subspace for each of predetermined first through third cumulative contribution ratios $\eta_{K1}$ through $\eta_{K3}$. It is assumed here that first cumulative contribution ratio $\eta_{K1}=0.99$, second cumulative contribution ratio $\eta_{K2}=0.9999$, and third cumulative contribution ratio $\eta_{K3}=0.999999$. Below, subspaces calculated by applying first through third cumulative contribution ratios $\eta_{K1}$ through $\eta_{K3}$ are referred to as first through third subspaces respectively. Which of cumulative contribution ratios $\eta_{K1}$ through $\eta_{K3}$ has high suitability depends on the monitoring target and required detection accuracy.

Learning data distance calculation section 340 calculates a distance to subspace creation data (reference distance) and distance between a subspace and contribution degree evaluation data (evaluation distance) for each of the first through third subspaces. Below, reference distances for the first through third subspaces are referred to as first through third reference distances respectively, and evaluation distances for the first through third subspaces are referred to as first through third evaluation distances respectively. Learning data distance calculation section 340 outputs the first through third reference distances and first through third evaluation distances to contribution degree determination section 350.

Learning data distance calculation section 340 outputs reference distances and evaluation distances as shown below, for example. Projector P for a subspace extended by means of principal component orthogonal base $U_K=[u_1, \ldots, u_K]$ and projector P⊥ for an orthogonal complement therefor are expressed by equation 8 below. U' is a transposed matrix of matrix U, and $I_M$ is a unit matrix of an M-th order.

$$P = U_K U_K'$$

$$P_\perp = I_M - P \quad \text{(Equation 8)}$$

At this time, learning data distance calculation section 340 calculates squared distance d2⊥ of a perpendicular line to subspace U (that is, the squared distance of the orthogonal complement) using equation 9 below. Furthermore, learning data distance calculation section 340 calculates the perpendicular distance d⊥ from calculated squared distance d2⊥ as a distance between a subspace and target feature data (hereinafter referred to simply as "distance").

(Equation 9)
$$\begin{aligned} d_\perp^2 &= \|P_\perp x\|^2 \quad [9]\\ &= \|(I_M - U_K U_K')x\|^2 \\ &= x'(I_M - U_K U_K')'(I_M - U_K U_K')x \\ &= x'(I_M - U_K U_K')x \end{aligned}$$

Contribution degree determination section 350 determines the suitability of the first through third contribution degrees used in first through third subspace creation, from the first through third reference distances and first through third evaluation distances. Specifically, contribution degree determination section 350 calculates suitability for each contribution degree based on an evaluation value indicating the size of a difference between an average reference distance and average evaluation distance. Below, evaluation values corresponding to the first through third contribution degrees are referred to as first through third evaluation values respectively.

FIG. 3 is a drawing for explaining the relationship between a contribution degree and distance. Specifically, FIG. 3 shows plots of learning data distances and analysis target data distances when the contribution degree is changed.

Here, it is assumed that principal component analysis section 330 divides certain learning data that does not include an unsteady state into subspace creation data A, subspace creation data B, and contribution degree evaluation data. It is also assumed that principal component analysis section 330 then performs subspace calculation from the entirety of subspace creation data A and subspace creation data B. Below, the distance between subspace creation data A and a subspace is referred to as reference distance A, the distance between subspace creation data B and a subspace is referred to as reference distance B, and the distance between contribution degree evaluation data and a subspace is referred to as an evaluation distance.

Figure 3A:
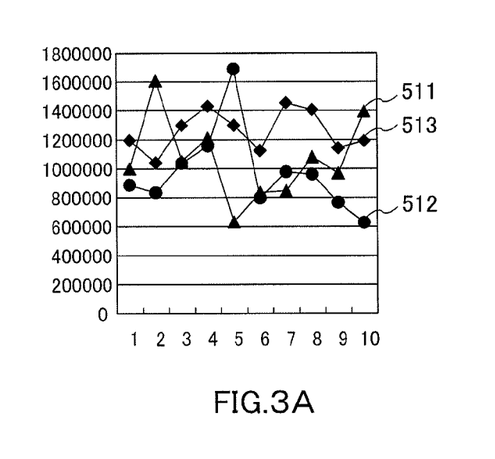
FIG. 3 is a drawing for explaining the relationship between a contribution degree and distance in Embodiment 1.
Figure 3B:
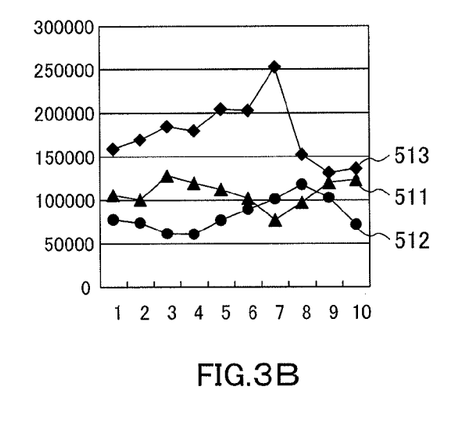
Figure 3C:
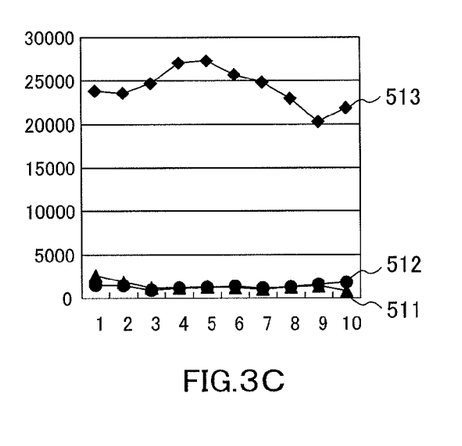

In FIG. 3A through FIG. 3C, the horizontal axis indicates time, and the vertical axis indicates distance. In the figures, triangle (▲) plot 511 indicates reference distance A, circle (•) plot 512 indicates reference distance B, and diamond (♦) plot 513 indicates an evaluation distance. FIG. 3A through FIG. 3C show distances when first cumulative contribution ratio $\eta_{K1}=0.99$, when second cumulative contribution ratio $\eta_{K2}=0.9999$, and when third cumulative contribution ratio $\eta_{K3}=0.999999$, respectively.

As shown in FIG. 3, overall, for all contribution degrees, the difference between reference distance A and reference distance B and an evaluation distance is comparatively larger than the difference between reference distance A and reference distance B.

However, comparing the first cumulative contribution ratio and second cumulative contribution ratio, the difference between reference distance A and reference distance B and an evaluation distance is smaller for the first cumulative contribution ratio. That is to say, there is only a minute difference between the distance of an item that is a learning target and the distance of an item that is not a learning target. This shows that the lower the set contribution degree, the higher is the probability of only abnormal motion being detected for which the difference from standard motion is larger.

Also, comparing the third cumulative contribution ratio and second cumulative contribution ratio, the difference between reference distance A and reference distance B and an evaluation distance is larger for the third cumulative contribution ratio. That is to say, there is a large difference in distance between an item that is a learning target and an item that is not a learning target. This shows that the higher the set contribution degree, the higher is the probability of standard motion being detected as abnormal motion based on a difference in fine motion.

Thus, the higher the contribution degree, the farther learning progresses with respect to subspace creation data, and the larger is the difference between a reference distance and evaluation distance. A difference in motion extracted even when a contribution degree is low can be said to be a large difference that is not affected by individual differences in learning data. Also, a difference in motion extracted when a contribution degree is extremely high can be said to be a fine difference in which even individual differences in learning data are reflected.

The size of a difference in motion that should be extracted differs according to the purpose of motion analysis. Consequently, it is helpful if, rather than presenting motion for which a difference is determined to be large based on a uniform criterion, the actual size of a difference of extracted motion is presented. Contribution degree determination section 350 determines the suitability of a contribution degree using a difference between an average reference distance and average evaluation distance as an evaluation value.

Motion analysis apparatus 300 configured in this way can determine the suitability of a contribution degree from learning data alone.

The operation of a motion analysis apparatus will now be described.

Figure 4:
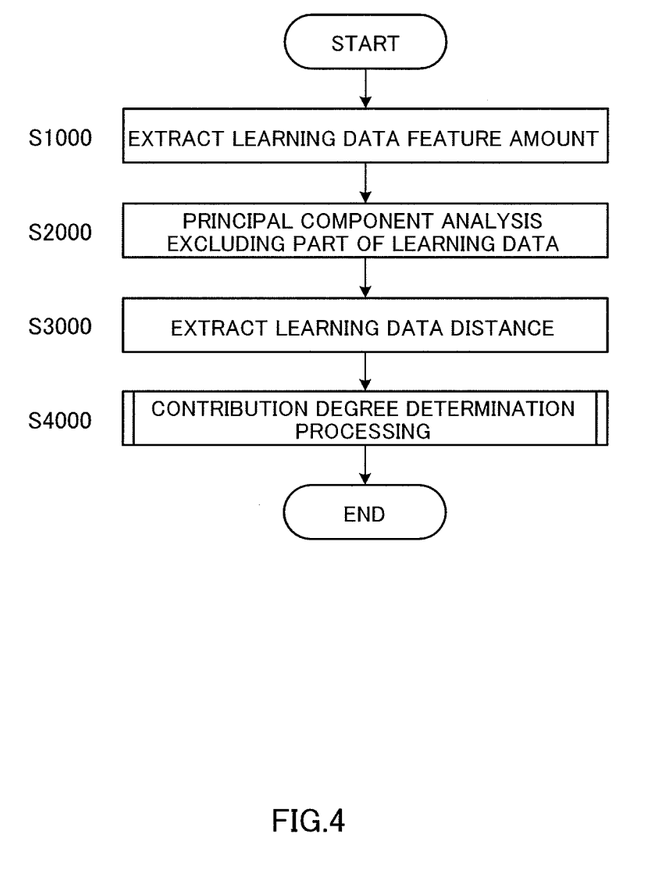
FIG. 4 is a flowchart showing the overall operation of a motion analysis apparatus according to Embodiment 1.

FIG. 4 is a flowchart showing the overall operation of motion analysis apparatus 300.

First, in step S1000, motion data input section 310 receives motion data (here, only learning data) as input, and learning data feature amount extraction is performed by motion feature extraction section 320.

Then, in step S2000, principal component analysis section 330 performs subspace calculation from subspace creation data when learning data is divided into subspace creation data and contribution degree evaluation data. Here, principal component analysis section 330 generates first through third subspaces as described above.

Then, in step S3000, learning data distance calculation section 340 calculates learning data distances with respect to a subspace—that is, reference distances and evaluation distances. Here, learning data distance calculation section 340 generates first through third reference distances and first through third subspaces as described above.

Then, in step S4000, contribution degree determination section 350 performs contribution degree determination processing. Contribution degree determination processing is processing that determines contribution degree suitability based on a reference distance and evaluation distance.

Figure 5:
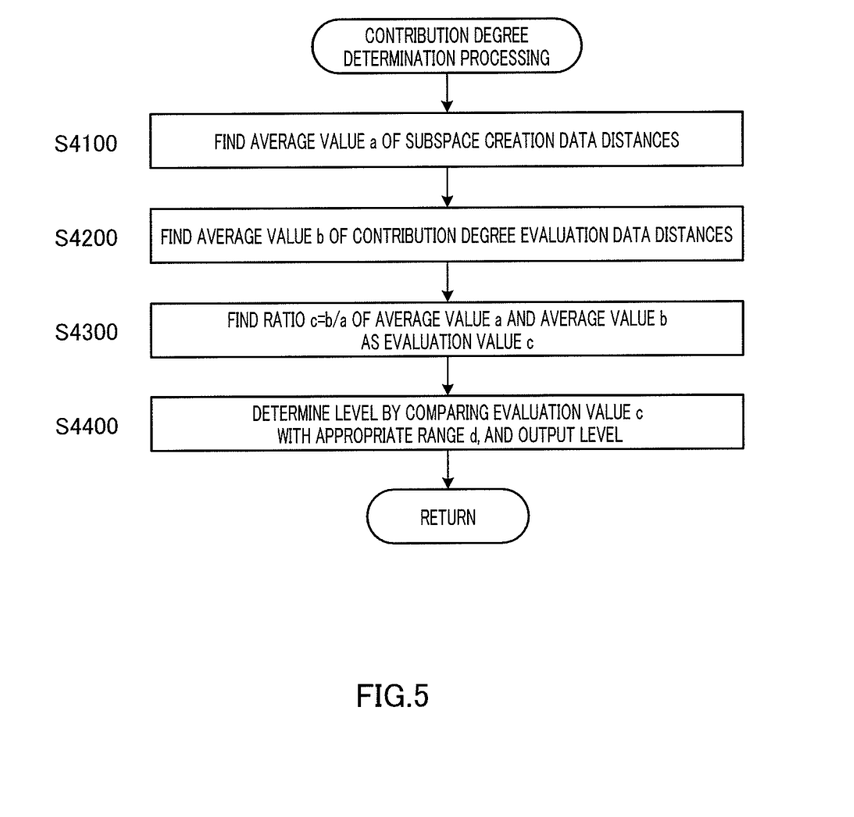
FIG. 5 is a flowchart showing contribution degree determination processing in Embodiment 1.

FIG. 5 is a flowchart showing contribution degree determination processing.

First, in step S4100, contribution degree determination section 350 finds average value a of subspace creation data distances (reference distances).

Then, in step S4200, contribution degree determination section 350 finds average value b of contribution degree evaluation data distances (evaluation distances). Steps S4100 and S4200 may be reversed in order.

Then, in step S4300, contribution degree determination section 350 finds ratio c=b/a of average value a and average value b as evaluation value c. Here, motion analysis apparatus 300 finds first through third evaluation values $c_1$ through $c_3$.

Figure 6:
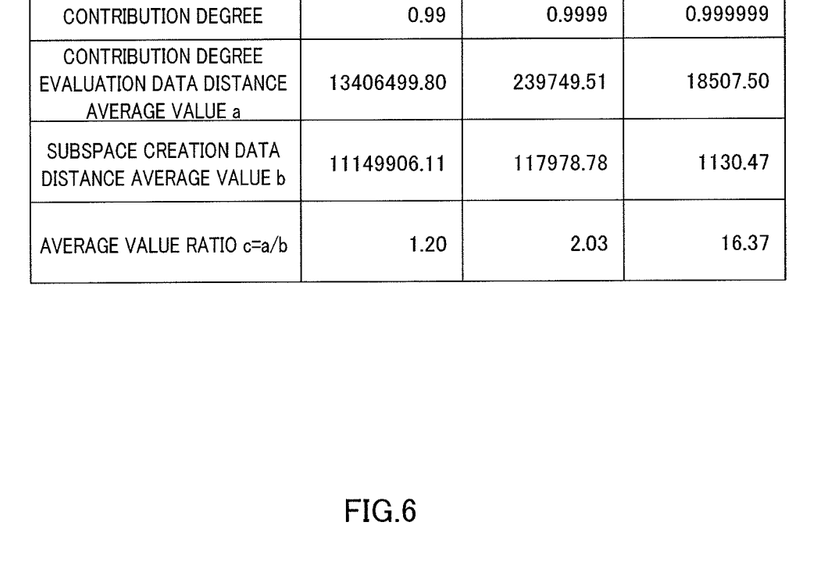
FIG. 6 is a drawing showing examples of evaluation value calculation when using an average value ratio in Embodiment 1.

FIG. 6 is a drawing showing examples of calculation of first through third evaluation values when using an average value ratio as evaluation value c.

As shown in FIG. 6, first through third evaluation values $c_1$ through $c_3$ corresponding to contribution degrees 0.99, 0.9999, and 0.999999, are, for example, 1.2, 2.03, and 16.37.

Then, in step S4400, contribution degree determination section 350 acquires preset appropriate range d, determines a contribution degree suitability level by comparing evaluation value c with appropriate range d, and outputs the determination result.

For example, appropriate range d is set to the range 1.5<c<2.5. Also, for example, three levels corresponding to less than or equal to appropriate range d, appropriate range d, and greater than or equal to appropriate range d, are set as contribution degree suitability levels. In this case, if evaluation value c is less than or equal to 1.5, contribution degree determination section 350 makes a "little learning" determination; if evaluation value c is greater than 1.5 and less than 2.5, contribution degree determination section 350 makes an "appropriate" determination; and if the value of evaluation value c is greater than 2.5, contribution degree determination section 350 makes an "excessive learning" determination. Therefore, in the example shown in FIG. 6, contribution degree determination section 350 makes a "little learning" determination for a contribution degree of 0.99, makes an "appropriate" determination for a contribution degree of 0.9999, and makes an "excessive learning" determination for a contribution degree of 0.999999.

By means of this kind of operation, motion analysis apparatus 300 calculates reference distances and evaluation distances, and determines the suitability of a contribution degree from a difference in the average values thereof.

Motion analysis apparatus 300 may also use a ratio for another distance related statistical quantity, such as a distance maximum value, minimum value, standard deviation, or the like, as evaluation value c. For example, motion analysis apparatus 300 may use reference distance average value a, evaluation distance average value b, reference distance standard deviation e, and evaluation distance standard deviation f, and calculate c=e/f or c=a/e as evaluation value c. Motion analysis apparatus 300 may also perform level determination using computation results of a plurality of statistical quantities. For example, motion analysis apparatus 300 may use c=a+e as evaluation value c, and set appropriate range d to a+e<b<a+2e+b. That is to say, motion analysis apparatus 300 makes a "little learning" determination if b<a+e, makes an "appropriate" determination if a+e<b<a+2e+b, and makes an "excessive learning" determination if a+2e+b<b.

Figure 7:
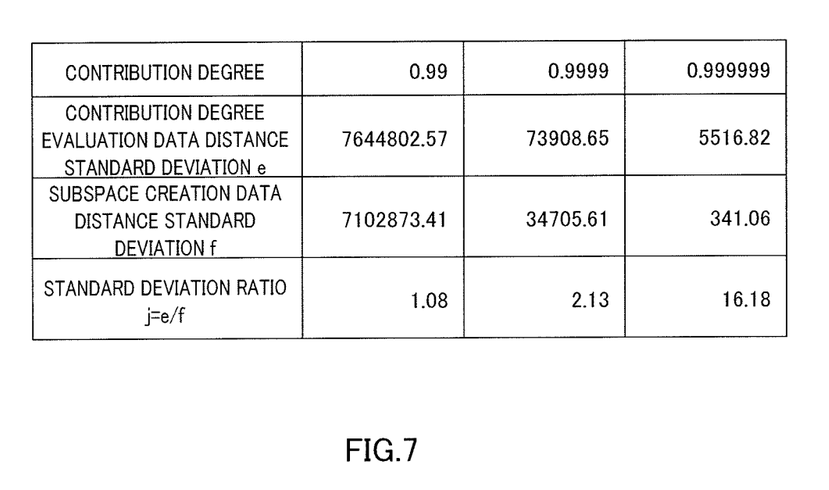
FIG. 7 is a drawing showing examples of evaluation value calculation when using a standard deviation ratio in Embodiment 1.

FIG. 7 is a drawing showing examples of contribution degree evaluation value calculation when using a standard deviation ratio as an evaluation value.

As shown in FIG. 7, first through third evaluation values $c_1$ through $c_3$ corresponding to contribution degrees 0.99, 0.9999, and 0.999999, are, for example, 1.08, 2.13, and 16.18. Level determination is performed in the same way as when average values are used in a relationship with appropriate range d.

As described above, motion analysis apparatus 300 can determine contribution degree suitability based on learning data alone, and present a determination result to a user. By this means, motion analysis apparatus 300 makes it possible for a user to efficiently analyze contribution degree suitability used in principal component analysis by confirming only a determination result, and for a contribution degree of an appropriate level to be set automatically. That is to say, motion analysis apparatus 300 enables a contribution degree that suits analysis conditions to be set easily.

Provision may also be made for motion analysis apparatus 300 to change a part used as subspace creation data among learning data, calculate a plurality of evaluation values for each contribution degree, and acquire a plurality of determination results. That is to say, motion analysis apparatus 300 may acquire a plurality of evaluation values and determination results by changing subspace creation data. Also, provision may also be made for motion analysis apparatus 300 to acquire a result representing that plurality of determination results as a final determination result. By this means, motion analysis apparatus 300 can obtain a statistically more stable result.

Provision may also be made for motion analysis apparatus 300 to repeat processing until a contribution degree determination result shows appropriateness while changing a contribution degree value, rather than performing determination for a predetermined plurality of contribution degrees. By this means, motion analysis apparatus 300 can find an appropriate contribution degree automatically simply through input of learning data.

Motion analysis apparatus 300 may also have a user interface for receiving a change to evaluation value c appropriate range d or a contribution degree subject to calculation from a user. By this means, a user can obtain an appropriate contribution degree more dependably while confirming contribution degree determination results.

Embodiment 2

In Embodiment 2 of the present invention, a user's analysis of analysis results is helped by presenting the user with contribution degree suitability together with analysis results for analysis target data.

Figure 8:
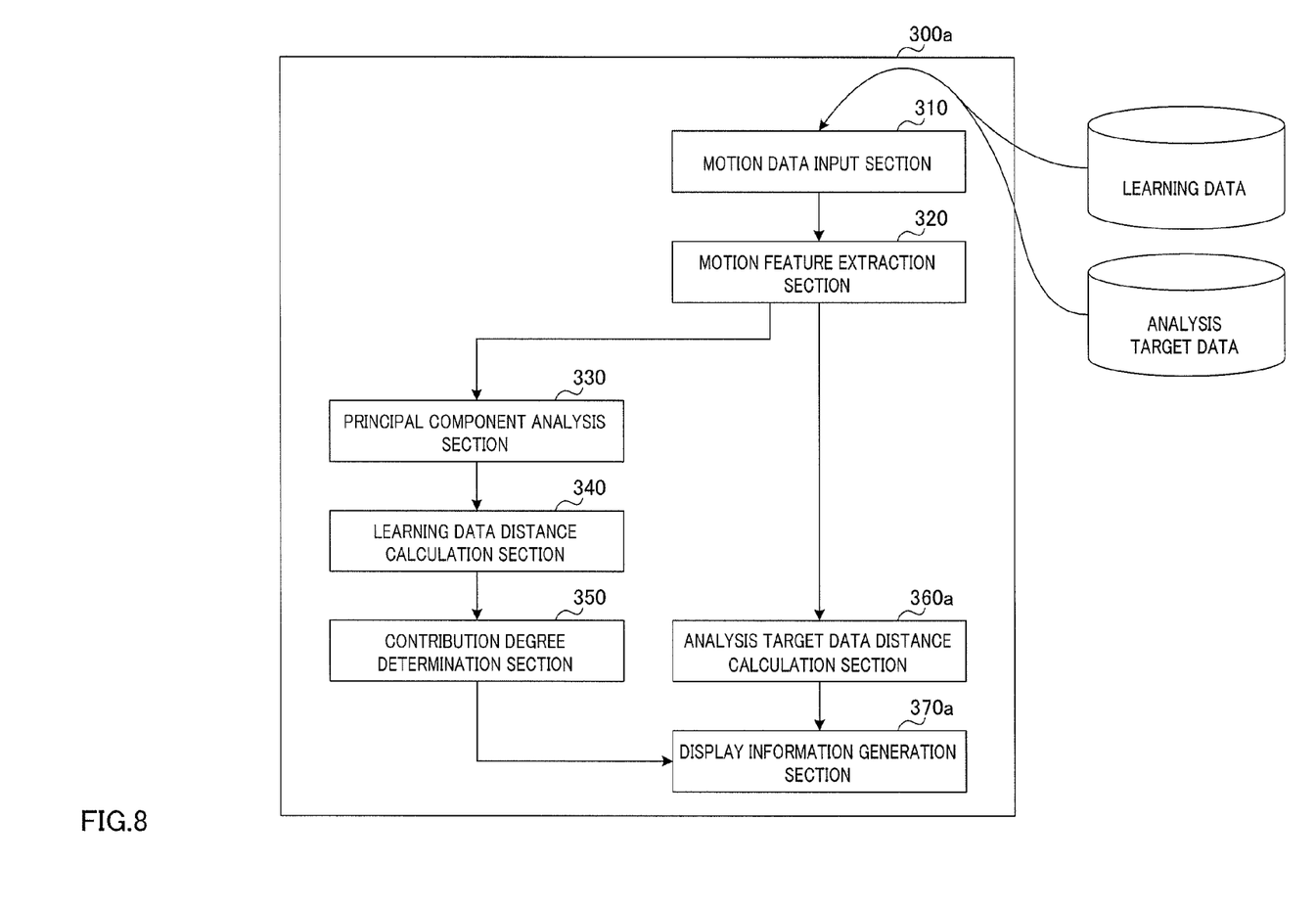
FIG. 8 is a block diagram showing the configuration of a motion analysis apparatus according to Embodiment 2 of the present invention.

FIG. 8 is a block diagram showing the configuration of a motion analysis apparatus according to this embodiment, and corresponds to FIG. 2 of Embodiment 1. Parts in FIG. 8 identical to those in FIG. 2 are assigned the same reference codes as in FIG. 2, and descriptions thereof are omitted here.

As shown in FIG. 8, motion analysis apparatus 300a according to this embodiment has analysis target data distance calculation section 360a and display information generation section 370a in addition to the configuration shown in FIG. 1.

In this embodiment, motion data input section 310 acquires learning data and analysis target data from sensor apparatus 200 in response to a request from motion feature extraction section 320, and transfers these data to motion feature extraction section 320. Motion feature extraction section 320 extracts a motion feature amount from learning data and analysis target data input from motion data input section 310, and outputs an extracted motion feature amount to analysis target data distance calculation section 360a. Contribution degree determination section 350 outputs a determination result concerning contribution degree suitability to display information generation section 370a.

Analysis target data distance calculation section 360a finds a subspace for each of first through third cumulative contribution ratios $\eta_{K1}$ through $\eta_K$ from the entirety of the learning data input from motion feature extraction section 320. Below, subspaces calculated by applying first through third cumulative contribution ratios $\eta_{K1}$ through $\eta_{K3}$ are referred to as first through third subspaces respectively. Learning data constituting the basis of first through third subspaces calculated by analysis target data distance calculation section 360a and learning data constituting the basis of first through third subspaces calculated by principal component analysis section 330 are not the same. Therefore, these subspaces do not necessarily coincide.

Then analysis target data distance calculation section 360a calculates a distance to analysis target data (hereinafter referred to as "analysis target distance") for each of the learned first through third subspaces. Below, analysis target distances corresponding to the first through third subspaces are referred to as first through third analysis target distances respectively. Then analysis target data distance calculation section 360a outputs the first through third analysis target distances to display information generation section 370a.

Comparison data generation section 370 generates a result display screen showing analysis target data analysis results from analysis target data distance calculation section 360a calculation results. Then comparison data generation section 370 presents the generated result display screen to the user by means of output apparatus 400.

Motion analysis apparatus 300a having this kind of configuration can present a user with analysis target data analysis results (that is, whether or not there is abnormal motion) together with contribution degree suitability. That is to say, by using motion analysis apparatus 300a, a user can perform motion analysis while checking contribution degree suitability.

The operation of motion analysis apparatus 300a will now be described.

Figure 9:
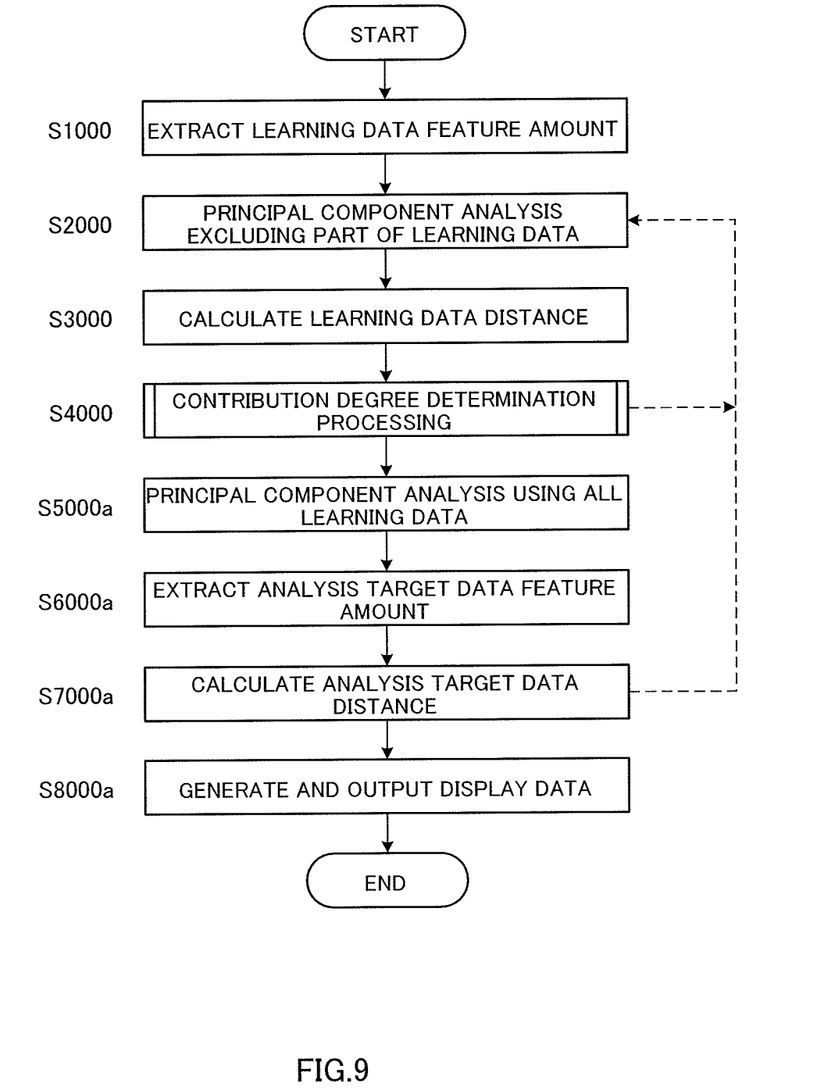
FIG. 9 is a flowchart showing the overall operation of a motion analysis apparatus according to Embodiment 2.

FIG. 9 is a flowchart showing the overall operation of motion analysis apparatus 300a, and corresponds to FIG. 4 of Embodiment 1. Parts in FIG. 9 identical to those in FIG. 4 are assigned the same step numbers as in FIG. 4, and descriptions thereof are omitted here.

After performing contribution degree determination processing (step S4000 in FIG. 5), motion analysis apparatus 300a proceeds to step S5000a.

In step S5000a, motion feature extraction section 320 extracts motion feature amounts of motions of all learning data. Learning data distance calculation section 340 performs principal component analysis by means of the first through third contribution degrees respectively, using all the learning data, and generates first through third subspaces. Provision may also be made for motion analysis apparatus 300a not to execute step S5000a processing, but to use the first through third subspaces generated in step S2000 directly.

Then, in step S6000a, motion feature extraction section 320 performs motion feature amount extraction for motions of analysis target data. Motion analysis apparatus 300a may perform step S6000a processing before step S5000a processing, or may perform step S6000a processing before or after step S1000, for example.

Then, in step S7000a, motion feature extraction section 320 calculates distances between the first through third subspaces and analysis target data motion feature amounts (analysis target distances).

Then, in step S8000, display information generation section 370a generates result display screen display data using analysis target distances for each contribution degree calculated in step S7000a. Then display information generation section 370a outputs the generated display data to output apparatus 400, and receives a result display screen user operation via input apparatus 500.

By means of this kind of operation, motion analysis apparatus 300a can present a user with analysis target data analysis results (that is, whether or not there is abnormal motion) together with contribution degree suitability.

Motion analysis apparatus 300a may also repeat the processing in steps S2000 through S7000a while changing the contribution degree. Furthermore, motion analysis apparatus 300a may also repeat the processing in steps S2000 through S4000 while changing the contribution degree, until a contribution degree determination result is a desired result, and then execute the processing in steps S5000 through S7000. By this means, motion analysis apparatus 300a can automatically extract a part corresponding to analysis target data abnormal motion using principal component analysis of a contribution degree matching a particular purpose.

Motion analysis apparatus 300a may also repeat the processing in steps S2000 through S7000 while changing the contribution degree, until a contribution degree determination result is a desired result. By this means, motion analysis apparatus 300a can, for example, automatically extract an unsteady part of analysis target data using principal component analysis in which contribution degree suitability is low (there is little learning). Also, motion analysis apparatus 300a can automatically extract an unsteady part of extracted analysis target data using principal component analysis in which contribution degree suitability is high (there is little learning, and an extracted unsteady part is estimated as of an individual difference level).

A result display screen may be a screen that displays only an analysis result for a contribution degree for which an "appropriate" determination has been made, or may be a screen that displays first through third contribution degree analysis results together with the suitability of those contribution degrees.

Figure 10:
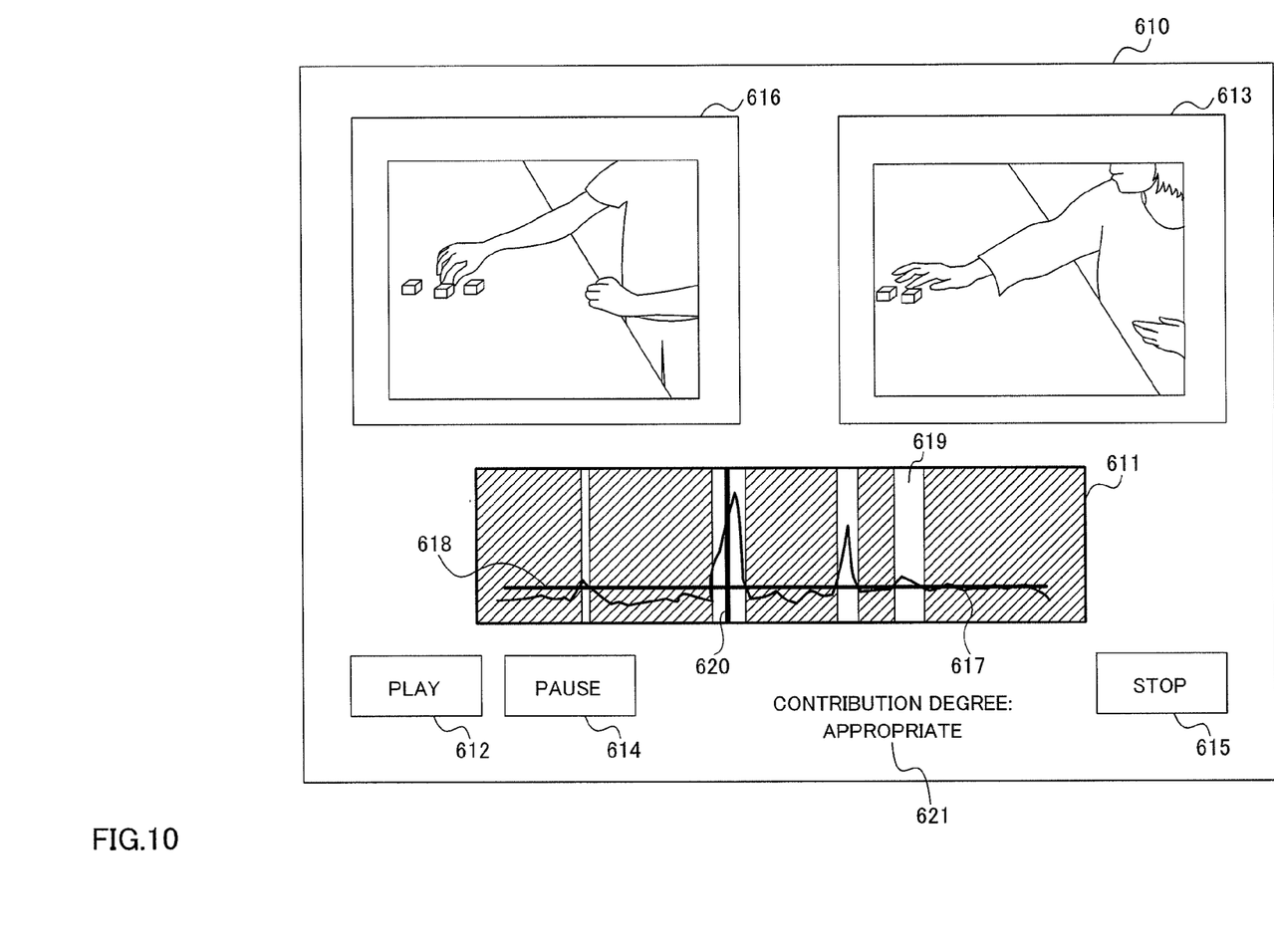
FIG. 10 is a drawing showing an example of a result display screen in Embodiment 2.

FIG. 10 is a drawing showing an example of a result display screen that displays only an analysis result for a contribution degree for which an "appropriate" determination has been made.

As shown in FIG. 10, result display screen 610 has analysis result display area 611, play button 612, image display area 613, pause button 614, stop button 615, and standard motion display area 616.

In result display screen 610, display information generation section 370a displays, in analysis result display area 611, analysis target distance time series data 617, threshold value display line 618 indicating a predetermined threshold value, and markers 619 indicating locations for which an analysis target distance exceeds the threshold value. Also, display information generation section 370a displays playback location display line 620 that can be moved horizontally in result display screen 610.

Furthermore, in result display screen 610, display information generation section 370a displays message 621 indicating that analysis target distance time series data 617 being displayed has been calculated by means of an appropriate contribution degree.

When play button 612 is clicked, display information generation section 370a plays back a captured image of motion subject to comparison (compared motion) in compared motion display area 613, and moves playback location display line 620 in accordance with the playback. When pause button 614 is clicked during image playback, display information generation section 370a temporarily stops image playback. Also, in standard motion display area 616, display information generation section 370a plays back a standard motion captured image in synchronization with playback of the compared motion captured image in compared motion display area 613.

By having result display screen 610 of this kind presented, a user can rapidly identify and check video of abnormal motion by moving playback location display line 620 to a marker 619 area and clicking play button 612. Also, a user can visually compare compared motion and standard motion. Furthermore, a user can confirm that analysis results are based on an apparatus contribution degree, and can therefore correctly understand analysis target data motion analysis results.

Figure 11:
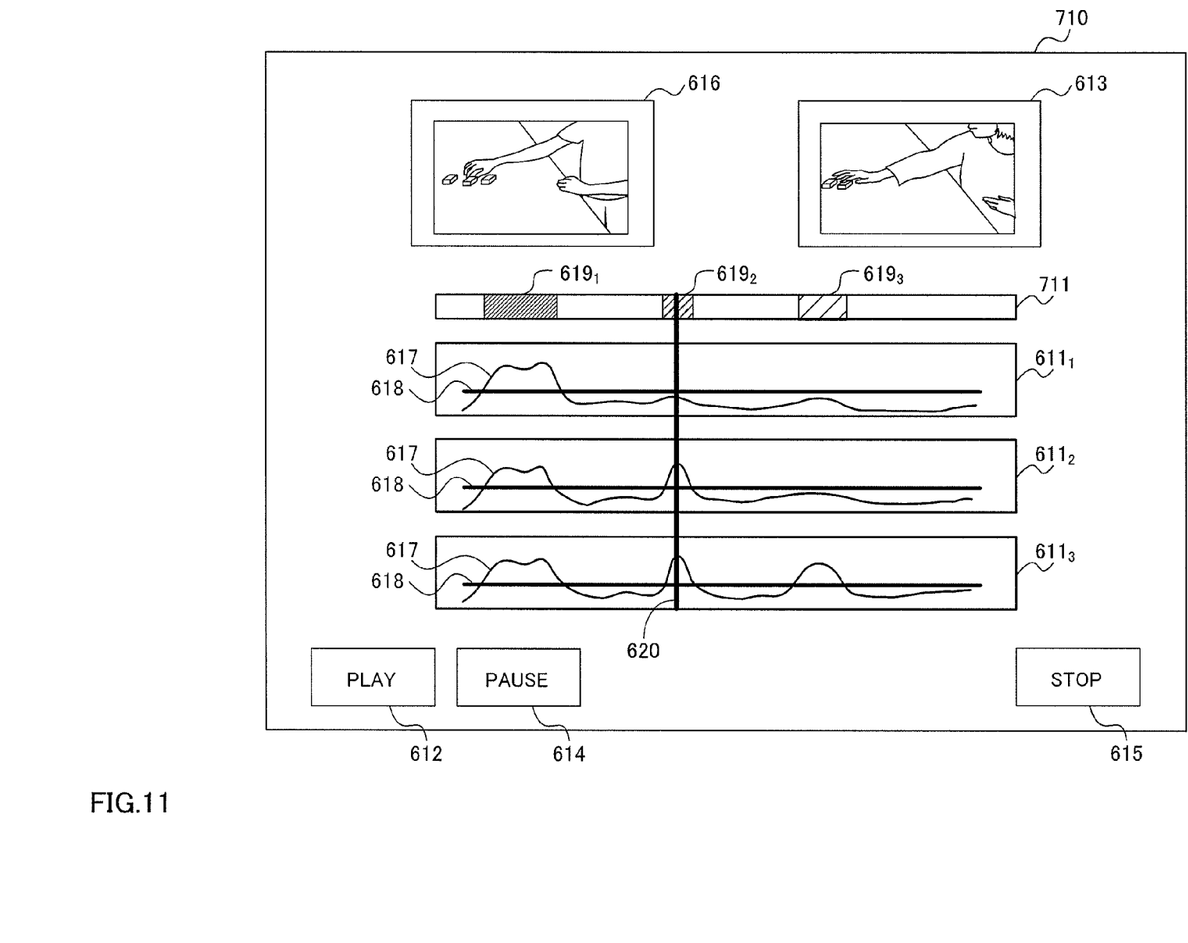
FIG. 11 is a drawing showing another example of a result display screen in Embodiment 2.

FIG. 11 is a drawing showing another example of a result display screen that displays first through third contribution degree analysis results together with the suitability of those contribution degrees, and corresponds to FIG. 10. Parts in FIG. 11 identical to those in FIG. 10 are assigned the same reference codes as in FIG. 10, and descriptions thereof are omitted here.

As shown in FIG. 11, result display screen 710 has first through third analysis result display areas $611_1$ through $611_3$ corresponding to first through third contribution degrees, and contribution degree suitability display area 711 indicating the suitability of each contribution degree.

In contribution degree suitability display area 711, display information generation section 370a displays first through third markers $619_1$ through $619_3$ indicating locations for which first through third contribution degree analysis target distances exceed a threshold value. If there are a plurality of relevant locations, display information generation section 370a displays marker 619 corresponding to a lower contribution degree preferentially, for example. Then display information generation section 370a displays the suitability of a contribution degree corresponding to each marker 619 by means of the color, pattern, or the like, of the relevant marker.

By having result display screen 710 of this kind presented, a user can check a plurality of motion analysis results for which the contribution degree differs, together with the suitability of those contribution degrees, and can therefore correctly understand analysis target data motion analysis results. Also, since analysis results of all levels are presented, a user can extract abnormal motion more dependably.

Since a range in which a value can be obtained—that is, the meaning indicated by such a value—differs for analysis target distances for different contribution degrees, it is difficult for a user to get a comprehensive grasp of analysis results simply by being presented with first through third analysis result display areas $611_1$ through $611_3$.

However, since contribution degree suitability display area 711 indicating the suitability of each contribution degree is also presented in result display screen 710, a user can easily get a comprehensive grasp of analysis results for different contribution degrees.

Thus, according to this embodiment, contribution degree suitability is presented to a user together with analysis target data analysis results, aiding a user's understanding of the analysis results.

In the above embodiments, contribution degrees subject to suitability determination have been assumed to be 0.99, 0.9999, and 0.999999, but the values and number are not limited to these. Also, the number of levels of contribution degree suitability and the evaluation values corresponding to each level are not limited to the above examples.

Motion data subject to analysis is not limited to camera video. Motion data subject to analysis may also be, for example, data obtained by imaging only a position of a marker acquired by a motion capture apparatus, or animation data created from a marker position.

A motion feature amount used in analysis is not limited to a CHLAC feature amount. For example, a motion feature amount used in analysis may be a high-order local feature amount using a weighting orientation histogram. In this case, a motion analysis apparatus can find a local orientation histogram of an image from a concentration gradient image, and use the found orientation histogram as a motion feature amount.

Furthermore, an image feature amount used in analysis is not limited to a CHLAC feature amount. Various kinds of data allowing extraction of a multidimensional motion feature amount indicating a motion feature—such as distance data, temperature data, acceleration data, magnetism data, audio data, or the like, obtained from motion—can be employed as an image feature amount used in analysis. In these cases, it is necessary for a sensor apparatus to be an appropriate apparatus such as a distance sensor, temperature sensor, accelerometer, magnetism sensor, or sound collector. These sensors may be attached to a motion subject (person) or may be attached to a tool used by a motion subject. For example, a sensor apparatus may use time series data including a marker identification number and position information acquired using motion capture as a multidimensional motion feature amount.

A motion analysis apparatus may also perform presentation of analysis results by means of speech output, together with or instead of screen display. In this case, it is necessary for the output apparatus to be provided with a loudspeaker or the like.

In the above embodiments, the present invention is applied to an apparatus that analyzes work motion in a factory, but this is not a limitation. The present invention can also be applied to various other kinds of apparatus, such as apparatuses that analyze various kinds of motion, including driving, sports, cooking, and musical performances, for example.

The disclosure of Japanese Patent Application No. 2010-121658, filed on May 27, 2010, including the specification, drawings and abstract, is incorporated herein by reference in its entirety.

INDUSTRIAL APPLICABILITY

A motion analysis apparatus and motion analysis method according to the present invention are suitable for use as a motion analysis apparatus and motion analysis method that enable a contribution degree that suits analysis conditions to be set easily.

REFERENCE SIGNS LIST

100 Motion analysis system
200 Sensor apparatus
300, 300a Motion analysis apparatus
310 Motion data input section
320 Motion feature extraction section
330 Principal component analysis section
340 Learning data distance calculation section
350 Contribution degree determination section
360a Analysis target data distance calculation section
370a Display information generation section
400 Output apparatus
500 Input apparatus

The invention claimed is:

1. A motion analysis apparatus that extracts unsteady motion using a moving image, the motion analysis apparatus comprising:
   a motion data input section that receives learning data as input;
   a motion feature extraction section that extracts a motion feature amount from the learning data input in the motion data input section;
   a principal component analysis section that performs principal component analysis on part of the learning data using a motion feature amount extracted by the motion feature extraction section, and learns a subspace;
   a learning data distance calculation section that calculates a distance between a motion feature amount of learning data extracted by the motion feature extraction section and a subspace learned by the principal component analysis section; and
   a contribution degree determination section that determines suitability of a contribution degree used in the principal component analysis by the principal component analysis section, from a distance calculated from learning data that is used in learning of the subspace by the principal component analysis section, and a distance calculated from learning data that is not used in learning of the subspace by the principal component analysis section, among distances calculated by the learning data distance calculation section.

2. The motion analysis apparatus according to claim 1, wherein the contribution degree determination section determines suitability of the contribution degree from a ratio between an average value of distances calculated from learning data that is used in learning of the subspace and an average value of distances calculated from learning data that is not used in learning of the subspace.

3. The motion analysis apparatus according to claim 1, wherein the contribution degree determination section determines suitability of the contribution degree from a ratio between a standard deviation of distances calculated from learning data that is used in learning of the subspace and a standard deviation of distances calculated from learning data that is not used in learning of the subspace.

4. The motion analysis apparatus according to claim 1, further comprising a display information generation section that outputs a determination result of suitability of the contribution degree.

5. The motion analysis apparatus according to claim 4, further comprising an analysis target data distance calculation section that calculates a distance between a motion feature amount of the analysis target data extracted by the motion feature extraction section and a subspace learned by the principal component analysis section, wherein the display information generation section outputs, together with a distance calculated by the analysis target data distance calculation section, a determination result of suitability of the contribution degree used in calculation of that distance.

6. The motion analysis apparatus according to claim 5, wherein:
   the principal component analysis section learns the subspace for each of a plurality of contribution degrees; and
   the display information generation section outputs a distance calculated by the analysis target data distance calculation section, and a suitability determination result, for each of the plurality of contribution degrees.

7. The motion analysis apparatus according to claim 1, wherein the motion feature amount is a cubic higher-order local auto-correlation feature.

8. A motion analysis method to extract unsteady motion using a moving image, the motion analysis method comprising:
   a step of receiving learning data as input;
   a step of extracting a motion feature amount from the learning data;
   a step of performing principal component analysis using a motion feature amount extracted from part of the learning data, and learning a subspace;
   a step of calculating a distance between a motion feature amount of the learning data and the subspace; and
   a step of determining suitability of a contribution degree used in the principal component analysis, from a distance calculated from learning data that is used in learning of the subspace, and a distance calculated from learning data that is not used in learning of the subspace, among distances between a motion feature amount of the learning data and the subspace.

* * * * *